United States Patent
Van Stensel

(10) Patent No.: US 10,778,575 B2
(45) Date of Patent: Sep. 15, 2020

(54) SYSTEMS AND METHODS FOR SCHEDULING A MESSAGE

(71) Applicant: GE Aviation Systems LLC, Grand Rapids, MI (US)

(72) Inventor: Jonathan Paul Van Stensel, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/437,016

(22) Filed: Feb. 20, 2017

(65) Prior Publication Data

US 2018/0241666 A1    Aug. 23, 2018

(51) Int. Cl.
*H04L 12/713* (2013.01)
*H04L 29/08* (2006.01)
*H04L 12/58* (2006.01)

(52) U.S. Cl.
CPC ............ *H04L 45/586* (2013.01); *H04L 51/14* (2013.01); *H04L 67/12* (2013.01); *H04L 51/26* (2013.01); *H04L 51/34* (2013.01)

(58) Field of Classification Search
CPC .................................................. H04L 45/586
See application file for complete search history.

(56) References Cited

U.S. PATENT DOCUMENTS

| | | |
|---|---|---|
| 7,675,919 B2 | 3/2010 | Vestal |
| 7,929,431 B2 | 4/2011 | Wilt et al. |
| 8,208,476 B2 | 6/2012 | Andreoletti et al. |
| 8,958,297 B1 | 2/2015 | Miller et al. |
| 9,001,849 B2 | 4/2015 | Bobrek et al. |
| 9,015,379 B1 | 4/2015 | Bobrek |
| 9,292,371 B1 * | 3/2016 | Clifford .............. H04L 43/0817 |

(Continued)

FOREIGN PATENT DOCUMENTS

| | | |
|---|---|---|
| CN | 101964750 A | 2/2011 |
| CN | 102098216 A | 6/2011 |

(Continued)

OTHER PUBLICATIONS

Mathieu Grenier, Lionel Havet, Nicolas Navet, "Pushing the limits of CAN—scheduling frames with offsets provides a major performance boost" 4th European Congress on Embedded Real Time Software (ERTS 2008), 2008, Toulouse, France. 2008.*

(Continued)

*Primary Examiner* — Un C Cho
*Assistant Examiner* — Yu-Wen Chang
(74) *Attorney, Agent, or Firm* — Dority & Manning, P.A.

(57) ABSTRACT

One example aspect of the present disclosure is directed to a method for scheduling a message. The method includes receiving, by one or more processors, an offset and an interval associated with a virtual link. The method includes receiving, by the one or more processors, an absolute count representing a start time. The method includes designating, by the one or more processors, a plurality of transfer times for the virtual link as a function of the offset and the interval. The method includes receiving, by the one or more processors, a message associated with the virtual link at a first time. The method includes transmitting, by the one or more processors, the message at a next transfer time in the plurality of transfer times.

20 Claims, 8 Drawing Sheets

(56) References Cited

U.S. PATENT DOCUMENTS

| | | | | |
|---|---|---|---|---|
| 2007/0100473 | A1* | 5/2007 | Shvodian | H04J 3/0632 |
| | | | | 700/19 |
| 2008/0020786 | A1 | 1/2008 | Smith et al. | |
| 2011/0242986 | A1 | 10/2011 | Balasubramanian et al. | |
| 2012/0250694 | A1 | 10/2012 | Hall et al. | |
| 2013/0179528 | A1 | 7/2013 | Gianisis et al. | |
| 2013/0208630 | A1 | 8/2013 | Bobrek | |
| 2013/0322276 | A1* | 12/2013 | Pelletier | H04W 72/085 |
| | | | | 370/252 |
| 2014/0068044 | A1* | 3/2014 | McKinney | H04L 41/0816 |
| | | | | 709/223 |
| 2014/0310412 | A1* | 10/2014 | Shinohara | B63B 49/00 |
| | | | | 709/224 |
| 2014/0328270 | A1* | 11/2014 | Zhu | H04W 74/002 |
| | | | | 370/329 |
| 2014/0369360 | A1 | 12/2014 | Carlstrom | |
| 2015/0106473 | A1 | 4/2015 | Bobrek | |
| 2015/0256463 | A1* | 9/2015 | Nanda | H04L 1/0002 |
| | | | | 370/230.1 |
| 2015/0319010 | A1 | 11/2015 | Traversone et al. | |
| 2016/0234807 | A1* | 8/2016 | Levy | H04W 56/00 |
| 2016/0294720 | A1 | 10/2016 | Varadarajan et al. | |
| 2018/0041917 | A1* | 2/2018 | Xi | H04L 1/1614 |

FOREIGN PATENT DOCUMENTS

| | | | |
|---|---|---|---|
| CN | 102497310 | A | 6/2012 |
| CN | 102523108 | A | 6/2012 |
| CN | 203151539 | U | 8/2013 |
| CN | 104486144 | A | 4/2015 |
| CN | 104618261 | A | 5/2015 |
| CN | 104717149 | A | 6/2015 |
| WO | WO2015012454 | A1 | 1/2015 |

OTHER PUBLICATIONS

Avionics Interface Technologies, "ARINC 664 Part 7 Product Overview" Apr. 22, 2013 Doc No. 40308001 v01 .01 .00 © 2013 Avionics Interface Technologies.*

Yomsi et al. (Controller Area Network (CAN): Response Time Analysis with Offsets, 9th IEEE International Workshop on Factory Communication Systems, May 21-24, 2012 (Year: 2012).*

GE Fanuc Embedded Systems, "AFDX/ARINC 664 Protocol" Tutorial, 2007,—24 pages.

U.S. Appl. No. 14/990,965, filed Jan. 8, 2016.

Extended European Search Report and Opinion issued in connection with corresponding EP Application No. 18157692.7 dated Jul. 13, 2018.

Machine Translated Chinese Search Report Corresponding to Application No. 201810153808 dated Jun. 16, 2020.

Machine Translated Chinese Office Action Corresponding to Application No. 201810153808 dated Jun. 24, 2020.

* cited by examiner

SYSTEMS AND METHODS FOR SCHEDULING A MESSAGE

FIELD

The present subject matter relates generally to aerial vehicles.

BACKGROUND

An aerial vehicle can include two or more end systems that communicate over a network. Each of the end systems can include applications that need to communicate with a certain combination of other end systems. Latency can be the time it takes for a message to travel from one end system to another. Jitter can be a variation in latency. It can be problematic if the network experiences high latency and/or high jitter.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for scheduling a message. The method includes receiving, by one or more processors, an offset and an interval associated with a virtual link. The method includes receiving, by the one or more processors, an absolute count representing a start time. The method includes designating, by the one or more processors, a plurality of transmission times for the virtual link as a function of the offset and the interval. The method includes receiving, by the one or more processors, a message associated with the virtual link at a first time. The method includes transmitting, by the one or more processors, the message at a next transmission time in the plurality of transmission times.

Another example aspect of the present disclosure is directed to a system for scheduling a message. The system includes one or more memory devices. The system includes one or more processors. The one or more processors are configured to receive an offset and an interval associated with a virtual link. The one or more processors are configured to receive an absolute count representing a start time. The one or more processors are configured to designate a plurality of transmission times for the virtual link as a function of the offset and the interval. The one or more processors are configured to receive a message associated with the virtual link at a first time. The one or more processors are configured to transmit the message at a next transmission time in the plurality of transmission times.

Other example aspects of the present disclosure are directed to systems, methods, aerial vehicles, avionics systems, devices, non-transitory computer-readable media for scheduling a message. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
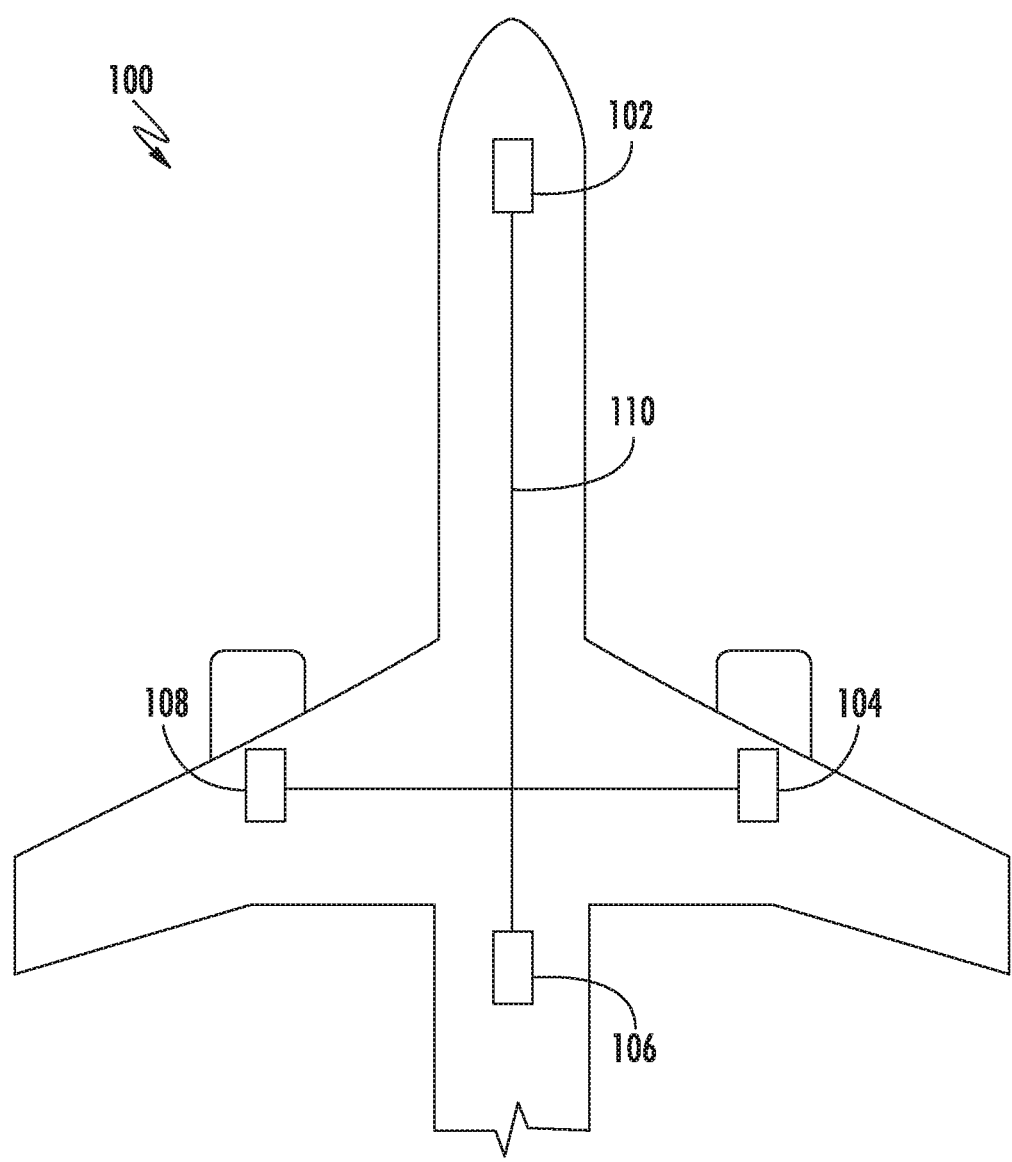
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can schedule a message. An aerial vehicle can include two or more end systems that communicate over a network. Each of the end systems can include applications that need to communicate with a certain combination of other end systems. For a particular end system, a virtual link can be created for each combination of other end systems with which applications on the particular end system need to communicate. A virtual link for the particular end system can be a communication path to the other end systems with which the particular end system is communicating. In some embodiments, a virtual link can be a temporary communication path between two or more end systems as opposed to a dedicated communication path between the end systems.

The particular end system can schedule messages sent across the network by assigning transmission times to each of its virtual links. The particular end system can maintain an absolute count on which messages are scheduled for transmission. Each virtual link of the particular end system can receive an offset and an interval. The interval can be a recurring time interval on an absolute count. The interval can influence the frequency with which the particular end system can transmit messages across an associated virtual link, which can influence a jitter associated with the associated virtual link. An offset can be a time added or subtracted from the interval on the absolute count.

Each associated virtual link of the particular end system can receive a maximum latency. A missed transmit time can occur when no message is transmitted at the time determined by the interval and the offset. After a missed transmit time occurs, subsequent transmit times can be designated at intervals indicated by the maximum latency. After a message is transmitted, the transmit times can once again be determined by the offset and the interval. The maximum latency can influence the latency for a virtual link.

If the particular end systems receives messages for transmission across two virtual links that are scheduled to transmit at the same time, the particular end system can transmit the message from the virtual link with a higher priority first. In an embodiment, each virtual link in the particular end system can be numbered. In an embodiment, a virtual link with a higher number can have a higher priority. In an embodiment, a virtual link with a lower number can have a higher priority.

In this way, the systems and methods according to example aspects of the present disclosure have a technical effect of balancing jitter and latency to schedule network messages in an efficient manner. Balancing jitter and latency preserves computational resources for other applications.

The systems and methods of the present disclosure also provide an improvement to a message scheduler. For instance, the methods and schedule of a message. For example, the systems and methods can receive an offset and an interval associated with a virtual link, receive an absolute count representing a start time, designate a plurality of transmission times for the virtual link as a function of the offset and the interval, receive a message associated with the virtual link at a first time, and transmit the message at a next transmission time in the plurality of transmission times. This can help maintain a reasonable jitter and latency for each virtual link of an end system.

FIG. 1 depicts an example aerial vehicle 100 in accordance with example embodiments of the present disclosure. The aerial vehicle 100 can include one or more end systems 102, 104, 106, 108 and a communication path 110 to facilitate communication between the one or more end systems 102, 104, 106, 108. The communication path 110 can include one or more communication buses, one or more switches, one or more routers, etc. The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2A:
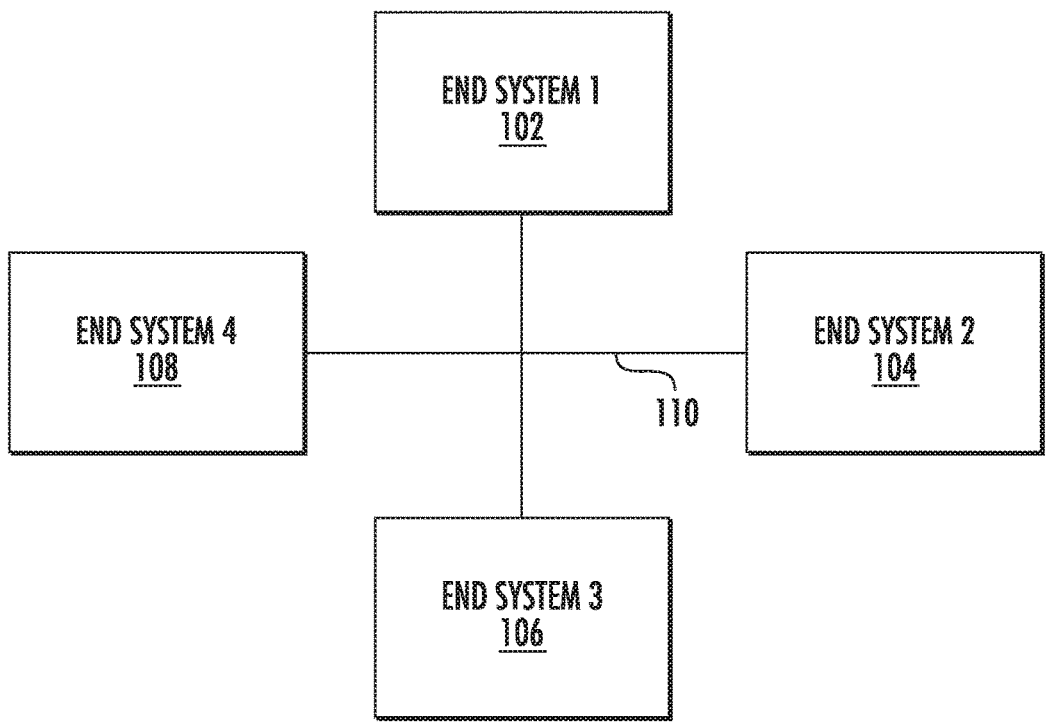
FIG. 2A depicts a block diagram of an example end systems according to example embodiments of the present disclosure.

FIG. 2A depicts a block diagram of an example end systems according to example embodiments of the present disclosure. A first end system 102, a second end system 104, a third system 106, and a fourth system 108 can be connected via a communication path 110. An end system 102, 104, 106, 108 can comprise an electronic system, a computing device, a control device, a processor, the like, and/or a combination of the foregoing. An end system 102, 104, 106, 108 can comprise, for instance, the control system 500 of FIG. 5. Each end system 102, 104, 106, 108 can communicate with another end system 102, 104, 106, 108 via the communication path 110. Each end system 102, 104, 106, 108 can form a virtual link with one or more other end systems 102, 104, 106, 108 to transmit messages to the one or more other end systems 102, 104, 106, 108. A virtual link for an end system 102, 104, 106, 108 can be a communication path to other end systems with which the end system 102, 104, 106, 108 is communicating. An end system 102, 104, 106, 108 can use one transmit virtual link (e.g., communication path from which the end system 102, 104, 106, 108 transmits messages to other end systems 102, 104, 106, 108) at a time. FIGS. 2B-2E will illustrate a set of virtual links associated with messages transmitted from the first end system 102 to one or more of the other end systems 104, 106, 108.

Figure 2B:
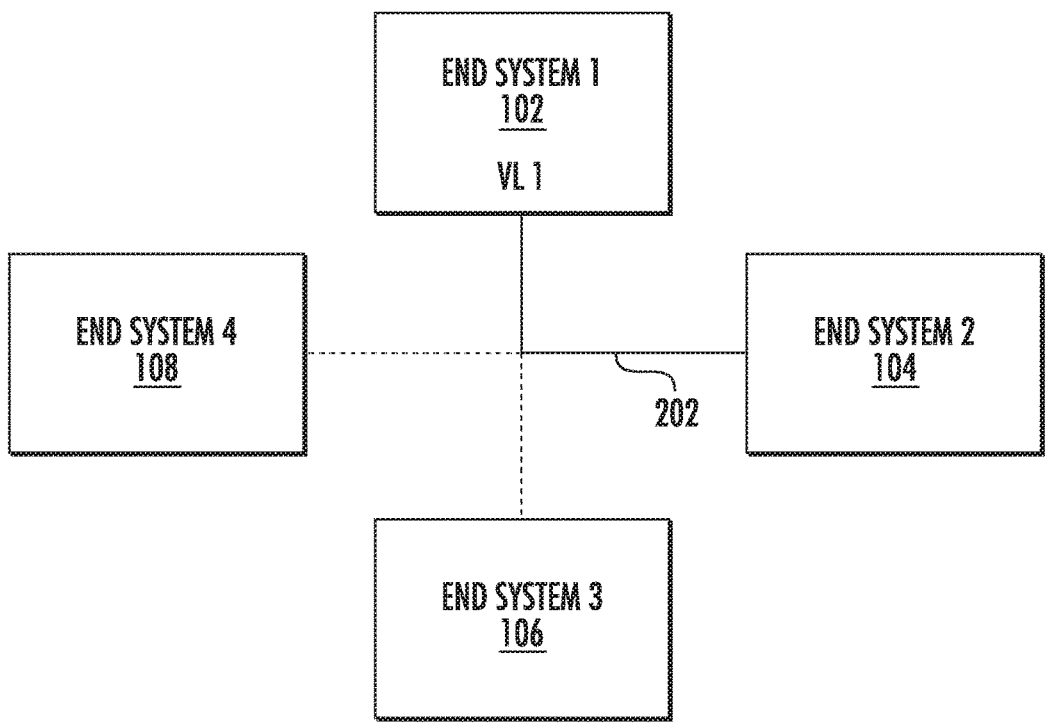
FIG. 2B depicts a block diagram of an example virtual link between end systems according to example embodiments of the present disclosure.
Figure 2C:
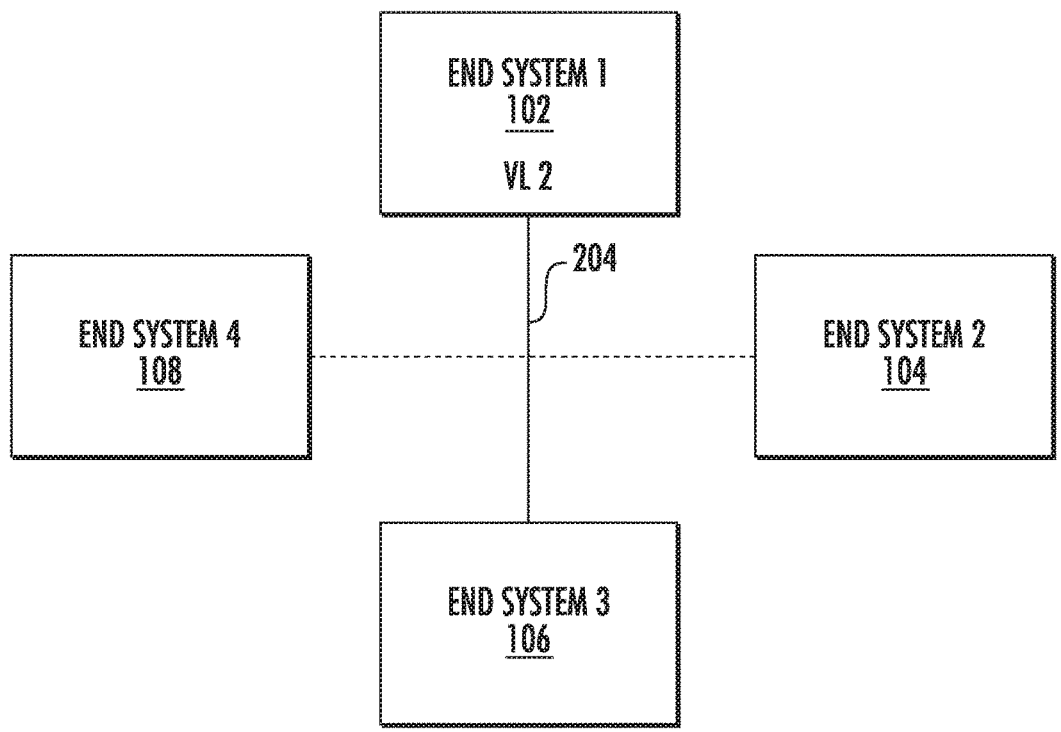
FIG. 2C depicts a block diagram of an example virtual link between end systems according to example embodiments of the present disclosure.
Figure 2D:
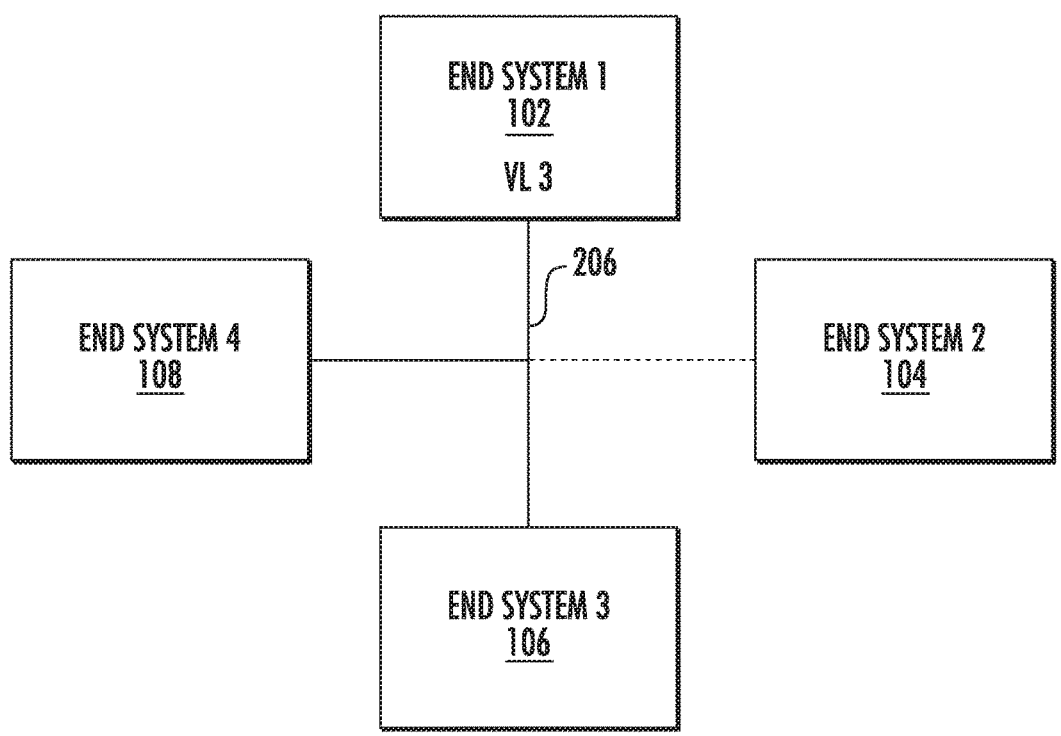
FIG. 2D depicts a block diagram of an example virtual link between end systems according to example embodiments of the present disclosure.
Figure 2E:
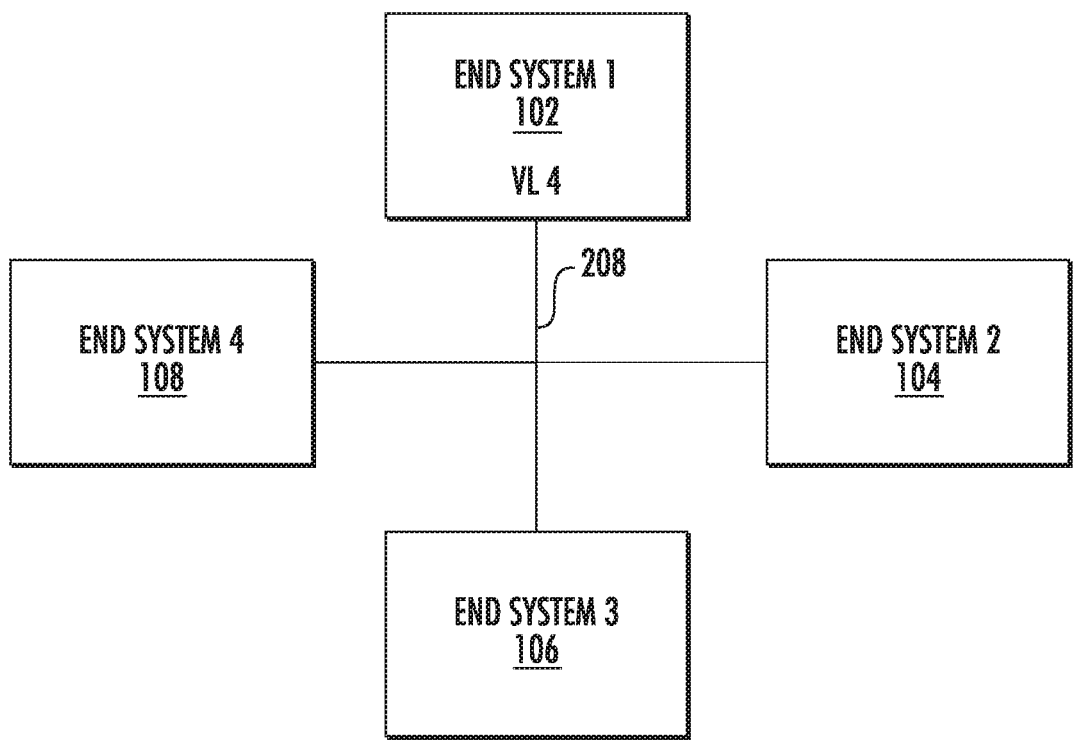
FIG. 2E depicts a block diagram of an example virtual link between end systems according to example embodiments of the present disclosure.

FIG. 2B depicts a block diagram of a first virtual link 202 between the first end system 102 and the second end system 104. Through the first virtual link 202, the first end system 102 can transmit messages to the second end system 104. FIG. 2C depicts a block diagram of a second virtual link 204 between the first end system 102 and the third end system 106. Through the second virtual link 204, the first end system 102 can transmit messages to the third end system 106. FIG. 2D depicts a block diagram of a third virtual link 206 between the first end system 102 and the third end system 106 and the fourth end system 108. Through the third virtual link 206, the first end system 102 can transmit messages to the third end system 106 and to the fourth end system 108. FIG. 2E depicts a block diagram of a fourth virtual link 208 between the first end system 102 and the second end system 104, the third end system 106, and the fourth end system 108. Through the fourth virtual link 208, the first end system 102 can transmit messages to the second end system 104, the third end system 106, and to the fourth end system 108.

Although FIGS. 2B-2E illustrate a set of virtual links associated with messages transmitted from the first end system 102 and received at one or more of the other end systems 104, 106, 108 (e.g., a set of virtual links associated with a transmit port of the first end system 102 and a receive port of one or more other end systems 104, 106, 108), each end system 102, 104, 106, 108 can have its own set of virtual links to dictate which end systems 102, 104, 106, 108 receives messages it transmits. Because the first end system 102 uses one of the virtual links 202, 204, 206, 208 at a time, a schedule, an example of which is described in reference to FIG. 3, can determine which transmit virtual link 202, 204, 206, 208, the first end system 102 should use.

Figure 3:
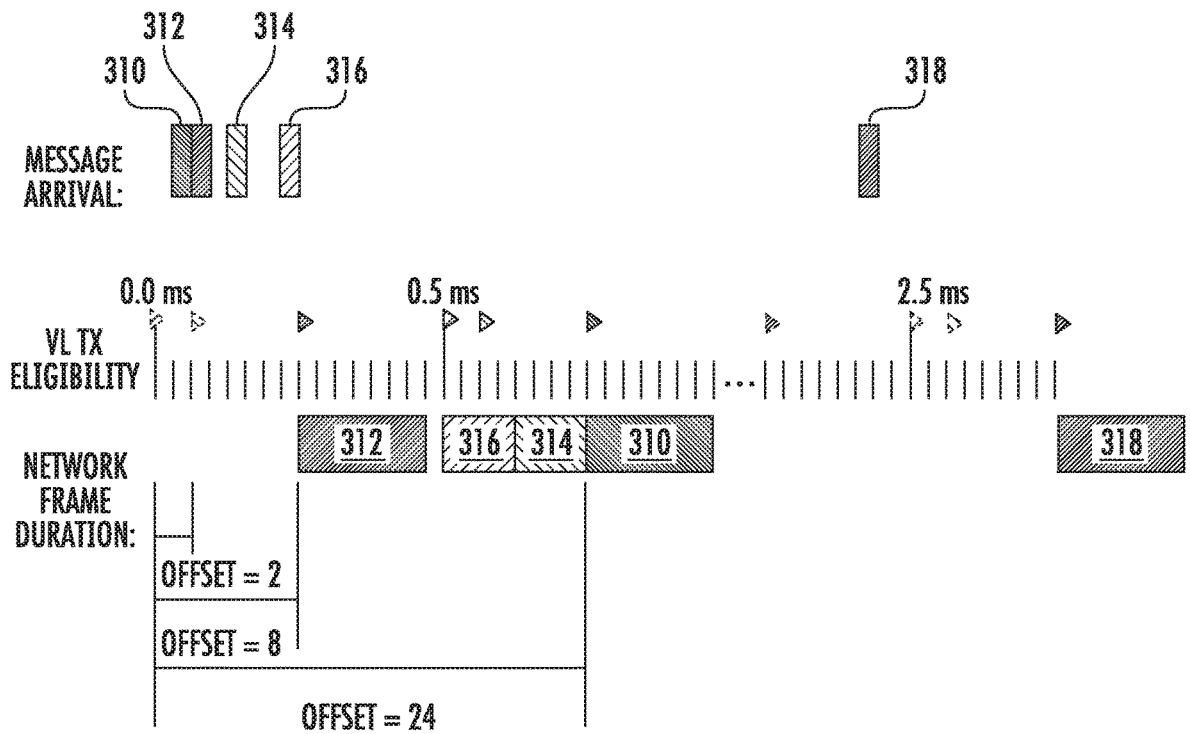
FIG. 3 depicts a diagram of a message scheduling system according to example embodiments of the present disclosure.

FIG. 3 depicts a diagram 300 of a message scheduling system according to example embodiments of the present disclosure. The diagram 300 includes a key. The key includes parameters associated with a first virtual link (a band allocation gap (BAG) interval of 0.5 milliseconds and an offset of 0), parameters associated with a second virtual link (a BAG interval of 0.5 milliseconds and an offset of 2 (which can correspond to 62.5 microseconds)), parameters associated with a third virtual link (a BAG interval of 2.0 milliseconds and an offset of 8 (which can correspond to 250 microseconds) and a maximum latency of 0.5 milliseconds), and parameters associated with a fourth virtual link (a BAG interval of 1.0 milliseconds and an offset of 24 (which can correspond to 750 microseconds)). Although specific values for the parameters are shown, they are used for illustrative purposes only and any values can be used. The key can provide a first pattern 302 associated with the first virtual link, a second pattern 304 associated with the second virtual link, a third pattern 306 associated with the third virtual link, and a fourth pattern 308 associated with the fourth virtual link. Although the diagram 300 illustrates four virtual links, any number of virtual links is envisioned.

At 0 microseconds from a start of an absolute count, transmission via the first virtual link can be enabled, based on the parameters associated with the first virtual link. A first message 310 associated with the fourth virtual link can be received at 10 microseconds from the start of the absolute count. A second message 312 associated with the third virtual link can be received at 50 microseconds from the start of the absolute count. At 62.5 microseconds from the start of the absolute count, transmission via the second virtual link can be enabled, based on the parameters associated with the second virtual link. A third message 314 associated with the second virtual link can be received at 100 microseconds from the start of the absolute count. A fourth message 316 associated with the first virtual link can be received at 200 microseconds from the start of the absolute count. At 250 microseconds from the start of the absolute count, the second message 312 can be scheduled to be transmitted based on the parameters associated with the third virtual link and transmitted via the third virtual link. At 0.5 milliseconds from the start of the absolute count, the fourth message 316 can be scheduled to be transmitted based on the parameters associated with the first virtual link and transmitted via the first virtual link. At 562.5 microseconds from the start of the absolute count, the third message 314 can be scheduled to be transmitted based on the parameters associated with the second virtual link. After transmission of the fourth message 316 is complete, the third message 314 can be transmitted via the second virtual link. At 750 microseconds from the start of the absolute count, the first message 310 can be scheduled to be transmitted based on the parameters associated with the fourth virtual link and transmitted via the fourth virtual link.

At 2.250 milliseconds from a start of an absolute count, transmission via the third virtual link can be enabled, based on the parameters associated with the third virtual link. A fifth message 318 associated with the third virtual link can be received at 2.4 milliseconds from the start of the absolute count. At 2.5 milliseconds from a start of an absolute count, transmission via the first virtual link can be enabled, based on the parameters associated with the first virtual link. At 2.5625 milliseconds from the start of the absolute count, transmission via the second virtual link can be enabled, based on the parameters associated with the second virtual link. Although the fifth message 318 would be scheduled to be sent at 4.250 milliseconds from the start of the absolute start on the basis of the BAG interval and offset associated with the third virtual link, the fifth message can be scheduled to be transmitted at 2.750 milliseconds from the start of the absolute count on the basis of the maximum latency associated with the third virtual link. The fifth message 318 can be transmitted via the third virtual link at 2.750 milliseconds from the start of the absolute count.

Figure 4:
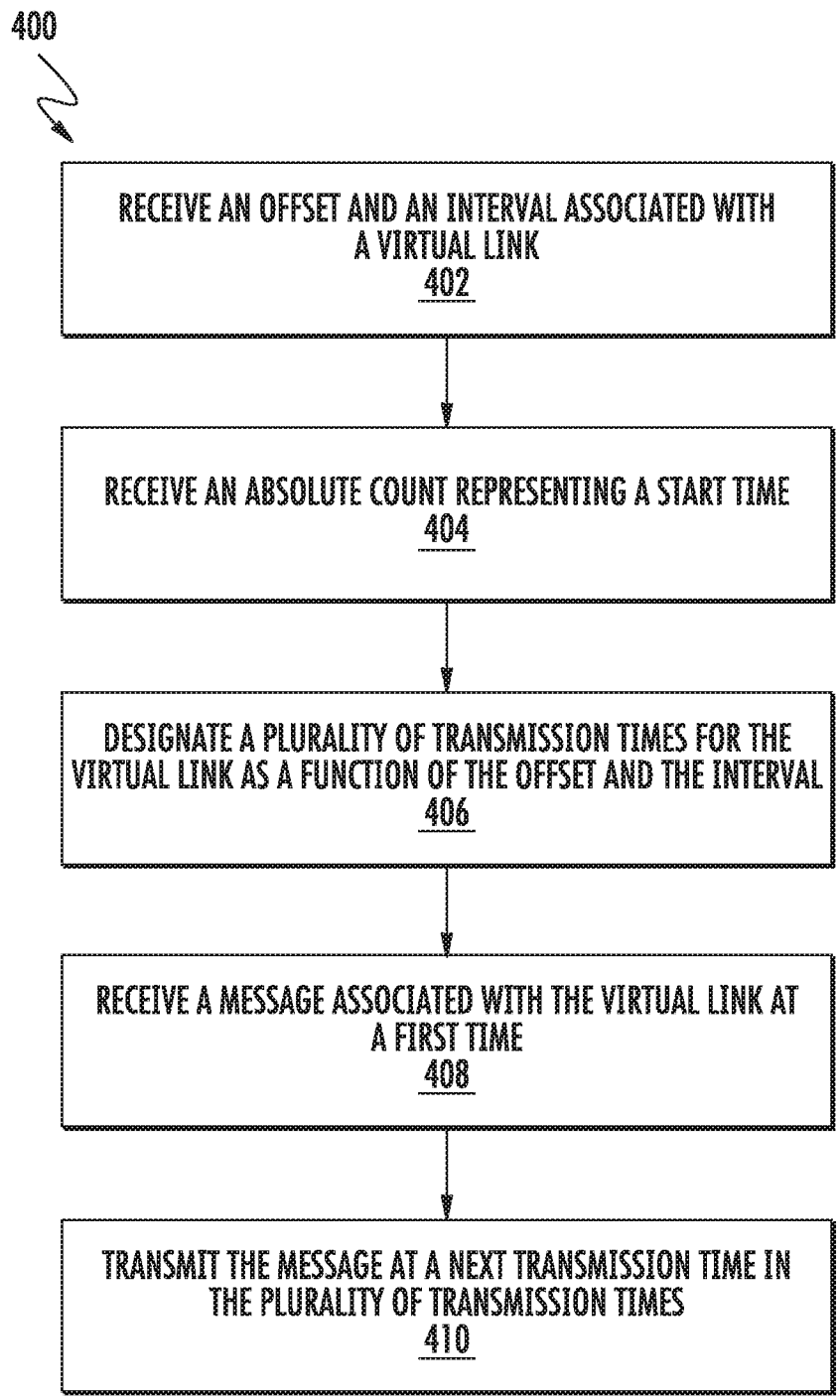
FIG. 4 depicts a flow diagram of an example method according to example embodiments of the present disclosure.

FIG. 4 depicts a flow diagram of an example method 400 for scheduling a message. The method of FIG. 4 can be implemented using, for instance, the control system 500 of FIG. 5. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), an offset and an interval associated with a virtual link can be received. For instance, the control system 500 can receive an offset and an interval associated with a virtual link. The offset can be different from a second offset associated with a second virtual link. The interval can be different from a second interval associated with a second virtual link. The interval can be a band allocation gap (BAG) interval. At (404), an absolute count representing a start time can be received. For instance, the control system 500 can receive an absolute count representing a start time. The start time can include 0 milliseconds.

At (406), a plurality of transmission times can be designated for the virtual link as a function of the offset and the interval. For instance, the control system 500 can designate a plurality of transmission times for the virtual link as a function of the offset and the interval. The function for designating the plurality of transmission times for the virtual link can include at least a multiplication of the interval with a whole number resulting in a product, and an addition of the product and the offset. The function for designating the plurality of transmission times for the virtual link can include designating the plurality of transmission times at each time (t) after the absolute count according to the equation of: t=interval*x+offset, wherein x includes any whole number of zero or more.

At (408), a message associated with the virtual link can be received at a first time. For instance, the control system 500 can receive a message associated with the virtual link at a first time. At (410), the message can be transmitted at a next transmission time in the plurality of transmission times. For instance, the control system 500 can transmit the message at a next transmission time in the plurality of transmission times. The message can be transmitted according to a deterministic protocol. The deterministic protocol can include Aeronautical Radio, Incorporated (ARINC) 664 part 7. The message can be transmitted according to a non-deterministic protocol.

Optionally, a maximum latency can be received. For instance, the control system 500 can receive a maximum latency. A second time can be determined. For instance, the control system 500 can determine a second time. The second time can be one of the plurality of transmission times. Optionally, no message associated with the virtual link was transmitted on the second time. A third time can be determined. For instance, the control system 500 can determine a third time. The second time subtracted from the third time can equal the maximum latency. The third time can be designated as the next transmission time. For instance, the control system 500 can designate the third time as the next transmission time. $t_m$ can represent a missed transmission time that is a time in which a virtual link is designated a transmission time but has no message to send. If a virtual link has a maximum latency and a missed transmission time, then a plurality of transmission times for the virtual link can be designated at each time (t) according to a second equation of: $t_t=t_m$+maximum latency*y, wherein y includes any whole number of one or more. $t_t$ can represent a time a message is transmitted according to the second equation. After a message associated with a virtual link is transmitted based on the maximum latency, a plurality of transmission times for the virtual link can be designated at each time (t) according to a third equation of: $t=t_t$+interval*z, wherein z includes any whole number of one or more. A fourth equation can be used to determine possible valid transmission times for a combination of interval, offset, and maximum latency sets. The fourth equation can be: t=interval*x+ maximum latency*y+offset, wherein x and y include any whole number of zero or more.

Optionally, a second message associated with a second virtual link can be received. For instance, the control system 500 can receive a second message associated with a second virtual link. The second message can be scheduled to be transmitted at the next transmission time. Transmission of the second message can be delayed until after the first message transmission completes. For instance, the control system 500 can delay transmission of the second message until after the first message transmission completes. Each virtual link can be associated with a priority, wherein the priority determines message order when multiple virtual links schedule message transmission at a same time. A first priority associated with the first virtual link can have precedence over a second priority associated with the second virtual link. Each virtual link can be associated with one or more components in an aerial vehicle.

Figure 5:
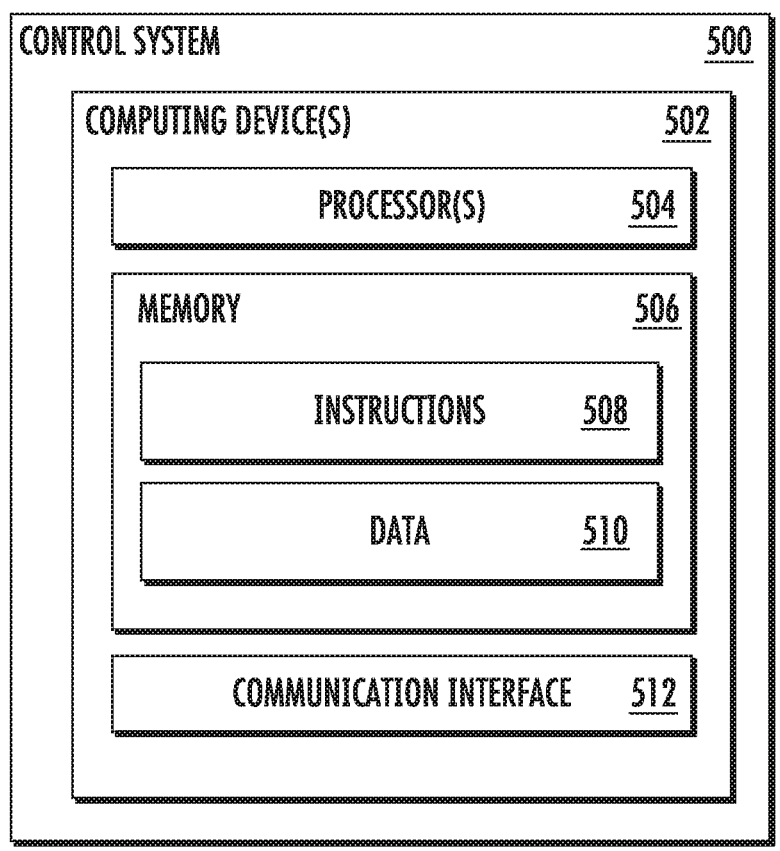
FIG. 5 depicts a control system for implementing one or more aspects according to example embodiments of the present disclosure.

FIG. 5 depicts a block diagram of an example control system 500 that can be used to implement methods and systems according to example embodiments of the present disclosure. As shown, the control system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for scheduling a message, as described with reference to FIG. 4.

The memory device(s) 506 can further store data 510 that can be accessed by the processors 504. For example, the data 510 can include any data used for scheduling a message, as described herein. The data 510 can include one or more table(s), function(s), algorithm(s), model(s), equation(s), etc. for scheduling a message according to example embodiments of the present disclosure.

The one or more computing device(s) 502 can also include a communication interface 512 used to communicate, for example, with the other components of system. The communication interface 512 can include any suitable components for interfacing with one or more network(s), including for example, transmitters, receivers, ports, controllers, antennas, or other suitable components.

Figure 6:
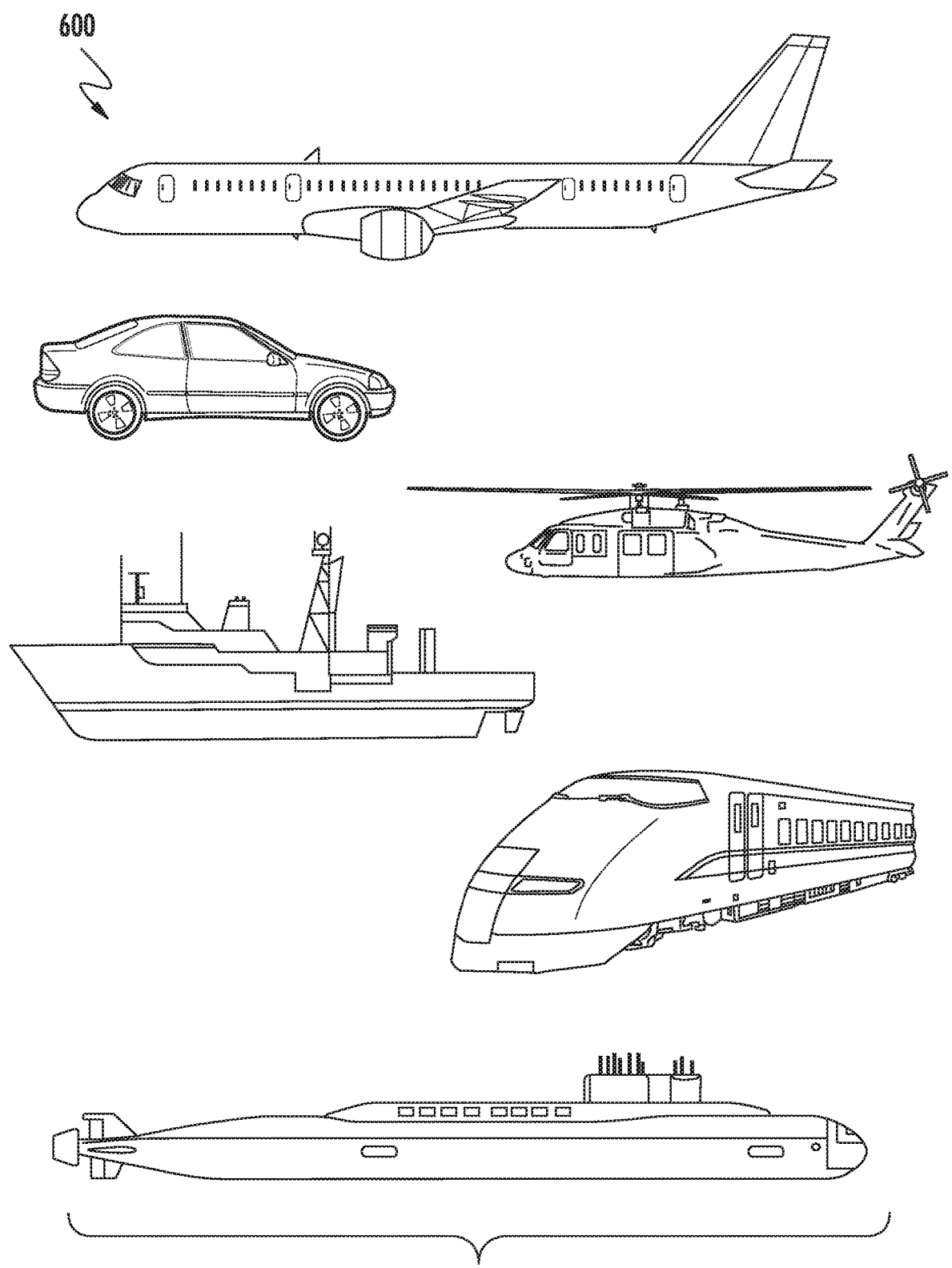
FIG. 6 depicts example vehicles according to example embodiments of the present disclosure.

Referring now to FIG. 6, example vehicles 600 according to example embodiments of the present disclosure are depicted. The systems and methods of the present disclosure can be implemented on an aircraft, helicopter, automobile, boat, submarine, train, and/or any other suitable vehicles. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of scheduling messages, the method comprising:
receiving, by one or more processors, an offset and an interval associated with a first virtual link;
receiving, by the one or more processors, an absolute count representing a start time;
designating, by the one or more processors, a first plurality of transmission times for the first virtual link according to a first equation, the first equation comprising a function of the offset and the interval;
receiving, by the one or more processors, a message associated with the first virtual link at a first time;
transmitting, by the one or more processors, the message at a next transmission time in the first plurality of transmission times;
receiving, by the one or more processors, a maximum latency, wherein the maximum latency comprises a duration of time representing a maximum amount of time needed for transmitting the message;
determining, by the one or more processors, a second time, wherein the second time is one of the first plurality of transmission times, and
when there exists no message associated with the first virtual link to be transmitted on the second time, designating, by the one or more processors, a second plurality of transmission times for the first virtual link according to a second equation, the second equation comprising a function of the second time and the maximum latency.

2. The method of claim 1, wherein designating the first plurality of transmission times for the first virtual link comprises at least a multiplication of the interval with a whole number resulting in a product, and an addition of the product and the offset.

3. The method of claim 1, wherein designating the first plurality of transmission times for the first virtual link comprises designating the first plurality of transmission times at each time (t) after the absolute count according to the equation of:

t=interval*x+offset, wherein x comprises any whole number of zero or more.

4. The method of claim 1, wherein the offset is different from a second offset associated with a second virtual link.

5. The method of claim 1, wherein the interval is different from a second interval associated with a second virtual link.

6. The method of claim 1, further comprising:
receiving, by the one or more processors, a second message associated with a second virtual link, wherein the second message is scheduled to be transmitted at the next transfer time; and
delaying, by the one or more processors, transmission of the second message until after the first message transmission completes.

7. The method of claim 6, wherein each virtual link is associated with a priority, wherein the priority determines message order when multiple virtual links schedule message transmission at a same time, and wherein a first priority associated with the first virtual link has precedence over a second priority associated with the second virtual link.

8. The method of claim 6, wherein each virtual link is associated with one or more components in an aerial vehicle.

9. The method of claim 1, wherein transmitting, by the one or more processors, the message at the next transfer time comprises transmitting the message according to a deterministic protocol.

10. The method of claim 9, wherein the deterministic protocol comprises Aeronautical Radio, Incorporated (ARINC) 664 part 7.

11. A system for scheduling messages, the system comprising:
one or more memory devices; and
one or more processors configured to:
receive an offset and an interval associated with a first virtual link;
receive an absolute count representing a start time;
designate a first plurality of transmission times for the first virtual link according to a first equation, the first equation comprising a function of the offset and the interval;
receive a message associated with the first virtual link at a first time; and
transmit the message at a next transmission time in the first plurality of transmission times;
receive a maximum latency, wherein the maximum latency comprises a duration of time representing a maximum amount of time needed to transmit the message;
determine a second time, wherein the second time is one of the first plurality of transmission times, and
when there exists no message associated with the first virtual link to be transmitted on the second time, designate a second plurality of transmission times for the first virtual link according to a second equation, the second equation comprising a function of the second time and the maximum latency.

12. The system of claim 11, wherein designate the first plurality of transmission times for the first virtual link comprises designate the first plurality of transmission times at each time (t) after the absolute count according to the equation of:

t=interval*x+offset, wherein x comprises any whole number of zero or more.

13. The system of claim 11, wherein the offset is different from a second offset associated with a second virtual link.

14. The system of claim 11, wherein the interval is different from a second interval associated with a second virtual link.

15. The system of claim 11, wherein the one or more processors are further configured to:
receive a second message associated with a second virtual link, wherein the second message is scheduled to be transmitted at the next transfer time; and
delay transmission of the second message until after the first message transmission completes.

16. An aerial vehicle comprising:
one or more memory devices; and
one or more processors configured to:
receive an offset and an interval associated with a first virtual link;
receive an absolute count representing a start time;
designate a first plurality of transmission times for the first virtual link according to a first equation, the first equation comprising a function of the offset and the interval;
receive a message associated with the first virtual link at a first time;
transmit the message at a next transmission time in the first plurality of transmission times;
receive a maximum latency, wherein the maximum latency comprises a duration of time representing a maximum amount of time needed to transmit the message;
determine a second time, wherein the second time is one of the first plurality of transmission times, and
when there exists no message associated with the first virtual link to be transmitted on the second time, designate a second plurality of transmission times for the first virtual link according to a second equation, the second equation comprising a function of the second time and the maximum latency.

17. The aerial vehicle of claim 16, wherein designate the first plurality of transmission times for the first virtual link comprises designate the plurality of transfer times at each time (t) after the absolute count according to the equation of:

t=interval*x+offset, wherein x comprises any whole number of zero or more.

18. The method of claim 1, comprising:
determining, by the one or more processors, a third time, wherein the second time subtracted from the third time equals the maximum latency, wherein the next transmission time in the second plurality of transmission times equals the third time.

19. The method of claim 1, comprising:
receiving, by the one or more processors, a second message associated with the first virtual link; and
transmitting, by the one or more processors, the second message at a next transmission time in the second plurality of transmission times.

20. The method of claim 1, wherein designating the second plurality of transmission times for the first virtual link comprises designating the second plurality of transmission times at each time (t) after the second time according to the equation of:

$t = t_m + \text{maximum latency} * y$, wherein $t_m$ is the second time and wherein y comprises any whole number of one or more.

\* \* \* \* \*